2,833,787
Patented May 6, 1958

2,833,787
EPOXIDATION PROCESS USING HYDROGEN PEROXIDE AND AN ACID SALT OF A HEAVY METAL PERACID

George J. Carlson, Berkeley, John R. Skinner, Oakland, Curtis W. Smith, Berkeley, and Charles H. Wilcoxen, Jr., San Lorenzo, Calif., assignors to Shell Development Company, New York, N. Y., a corporation of Delaware No Drawing. Application March 15, 1955
Serial No. 494,552
16 Claims. (Cl. 260—348.5)

This invention relates to the synthesis of alpha, beta-epoxides, that is, compounds containing an oxirane ring

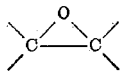

It deals with an advantageous method for producing these compounds by reacting ethylenic compounds with hydrogen peroxide.

Epoxides are an important class of organic compounds which are finding more and more applications as intermediates in the manufacture of resins, polyols and other useful products. They have been relatively expensive to synthesize, however, because it has been necessary to resort either to epoxidation of the corresponding ethylenic compound with an organic peracid or to halohydrination of the ethylenic starting material followed by reaction with a base. Both of these procedures have disadvantages. Organic peracids are high priced reagents, their use complicates the recovery of the product, and the yields with many types of ethylenic compounds are much lower than is desirable. The halohydrination route to epoxides often involves by-product formation which causes loss of yield and requires large investments of capital for the equipment required in the different steps of the process.

An important object of the present invention is to provide a new method whereby epoxides can be produced directly in one step from the corresponding ethylenic compound and hydrogen peroxide. A special object is the provision of an efficient method of producing epoxides from ethylenic hydrocarbons and/or ethylenic alcohols which have given special difficulty in epoxidation by prior methods. Another object is the provision of an improved method for manufacturing polyols by epoxidizing an ethylenic hydrocarbon or alcohol and hydrolyzing the epoxide produced. Still other objects and advantages of the invention will be apparent from the following description of the new process and of some representative examples of its numerous applications.

It has been found that ethylenic compounds can be converted to the corresponding epoxy compounds, that is, compounds having the same structure as the starting ethylenic compound except that an epoxy oxygen atom replaces one of the bonds connecting at least one pair of doubly bonded carbon atoms in an aliphatic group thereof, by reaction in an acidic aqueous medium with hydrogen peroxide in the presence of an acid salt of a peracid of a heavy metal, hereinafter referred to generically as an acid persalt catalyst, while maintaining the pH at a value of at least 3, most preferably between about 4.5 and 6.0. There are numerous references in the literature and patents to reactions between ethylenic compounds and hydrogen peroxide. There has been no reported production of epoxides in this way, however. These reactions have been carried out with peracids of heavy metals as catalysts. Such catalysts are relatively strong acids. They impart a pH of the order of 1.5 or less to the reaction mixture at the concentration in which they are used and result in the production of hydroxylation products rather than epoxides. Reactions between ethylenic compounds and hydrogen peroxide in the critical range of acidity as used in the present process have not previously been carried out. The customary organic peracid epoxidizing agents such as peractic, performic and perbenzoic acids, cannot be used successfully in this pH range. Epoxides are known to undergo hydration readily in aqueous acid media and it would have been predicted that reactions carried out in this acid range would not result in any substantial yields of epoxy products. It was unexpected, therefore, to find that by using an acid persalt catalyst and maintaining the pH of the mixture in the range of 3 to about 6.5 as indicated, epoxide products can be obtained in substantial yields which make this a commercially attractive method for their synthesis. The pH of the mixture should not be allowed to fall below 3.0 during the reaction as otherwise the rate of hydration of the epoxide becomes so high that the production of epoxide is greatly reduced. On the other hand, it is important to keep the pH of the reaction mixture below 7 since at higher pH the rate of hydrogen peroxide decomposition becomes undesirably high with consequent loss in yield.

The catalysts used in the reaction are acid salts of the acids of the heavy metals. Under the reaction conditions they form acid persalts which are probably the effective catalytic agent. Any of the acids of the heavy metals which are known to be effective hydroxylation catalysts can be converted to their acid salts and used as catalysts in the present process. Acid salts of the acids of the metals of group VI of the periodic table are a useful class of catalysts. However, the acid salts of the acids of tungsten have been found to be outstandingly superior to any of the other catalysts which have been tested in the new reaction. These include the acid salts not only of the simple acids of tungsten such as tungstic acid, but also the polytungstic acids, that is, both the homopolytungstic acids and the heteropolytungstic acids. Examples of acid salts of tungstic acids which are effective epoxidation catalysts are the acid tungstates, the acid borotungstates, the acid chromotungstates, the acid molybdotungstates, the acid phosphotungstates, the acid selenotungstates, the acid tellurotungstates, the acid tungstoarsenates, and the acid tungstomolybdoborates. The acid salts of the acid of molybdenum are another subgroup of catalysts which have been found to be suitable for use in the new process. Typical examples of suitable acid salt catalysts of this type are, in addition to the acid salts of molybdic acid, the acid phosphomolybdates, the acid arsenomolybdates, the acid bismomolybdates, and the like. Other acid salt catalysts which can also be used, although as a rule they are less efficient in the new process, are the acid vanadates, the acid chromates, the acid selenates, the acid tellurates, and the like. The acid salt used should preferably be one which is soluble in the aqueous reaction mixture, at least in the form of the acid persalt which is formed on contact of the acid salt with hydrogen peroxide. Alkali metal or ammonium acid salts are especially advantageous because of their solubility, economy and effectiveness, but alkaline earth metal or other acid salts can also be used. The acid salt catalysts can be used alone or together with other materials which may or may not have a catalytic effect on the reaction. They can, for example, be employed together with the corresponding neutral salts or free acids provided the pH of the mixture is maintained within the acid range previously indicated.

The new process can be successfully carried out with ethylenic compounds generally and the invention broadly comprises reacting any compound having an ethylenic double bond between two carbon atoms in an aliphatic or cycloaliphatic group with hydrogen peroxide in an aqueous medium in the presence of an acid salt of an acid of a heavy metal under acid conditions at a pH greater than 3. While all ethylenic compounds are thus operative in the process, they are not equivalents therein but give varying yields of epoxides together with different proportions of hydroxy products depending upon their relative rates of epoxidation and the rates of hydration of the resulting epoxides under the prevailing reaction conditions. For the sake of simplicity in making clear the preferred methods of applying the new process, they will be described with particular reference to the reaction of hydrogen peroxide with ethylenic hydroxy compounds, especially beta,gamma-ethylenic alcohols and polyols. This type of reaction has been chosen for purposes of illustration not only because especially valuable products can be obtained in this way but also because the process of the invention is particularly effective in minimizing the undesirable side reactions to which this type of starting ethylenic compound is especially susceptible in reactions with hydrogen peroxide. Typical examples of this preferred type of starting ethylenic compound are, for instance, allyl alcohol, methallyl alcohol, crotyl alcohol, allyl carbinol, methy vinyl carbinol, dimethyl allyl carbinol, oleyl alcohol, citronellol, geraniol, linalool, cyclohexenol, the terpineols, cinnamyl alcohol, and related mono- and poly-olefinic mono- and poly-hydroxy alcohols. The water-soluble ethylenic compounds, especially the water-soluble ethylenic alcohols and diols, are particularly advantageous starting compounds for the new process.

The particular combination of reaction conditions which will be most advantageous in a particular case will depend upon the ethylenic compound or mixture thereof which is being epoxidized and the acid persalt catalyst chosen. High rates of epoxidation are promoted by a high concentration of ethylenic compound in the reaction mixture. The rate of epoxidation is also directly proportional to the concentration of the acid persalt catalyst. For economic reasons it is usually advantageous to limit the amounts of ethylenic compound and of catalyst which are employed since the costs of recovery of catalyst and of excess ethylenic compound can be reduced in this way. As the catalyst concentration is reduced the pH of the reaction mixture is preferably increased within the range of 3 to about 6.5 for best yields of epoxide and we, therefore preferably use a catalyst concentration of about 0.02 to about 0.5% at a pH of about 5 to about 6.5, decreased peroxide loss also being obtained under these conditions. In order to avoid hydration of the epoxide under the acid conditions used for the reaction, it is desirable both to shorten the reaction time as much as possible and to operate at a low temperature. However, these operating variables are interrelated. Lower temperatures require longer times for complete reaction of the hydrogen peroxide, for example. The pH of the reaction medium in the required range of 3 to about 6.5 has little or no effect upon the rate of epoxidation, but increasing acidity within this range tends to increase rate of hydration of the epoxide initially formed. Because of these considerations the reaction is preferably conducted under the following conditions:

Mole ratio of ethylenic compound to hydrogen peroxide, 1.0 to 5.0, most preferably about 1.2 to about 2

Mole ratio of water to hydrogen peroxide, 5:1 to 70:1, most preferably about 15:1 to about 40:1

Concentration of acid persalt catalyst (weight percent of reaction mixture), 0.01 to about 5%, most preferably about 0.02 to about 0.5%

Temperature, about 15° to about 100° C., most preferably about 35° to about 70° C.

Reaction time, about 30 min. to about 150 hrs., most preferably about 2 hrs., to about 90 hrs.

The process of the invention can be carried out batchwise, intermittently or continuously. One convenient method of batch operation comprises adding the hydrogen peroxide to a reactor, preferably provided with temperature control means and mixing means, which has been previously charged with the ethylenic compound, water and catalyst. A procedure which has been found to give good results in continuous operation comprises reaction in a plurality of reactors connected in series. Each reactor is equipped with temperature control means and mixing means which can conveniently be means for external circulation of the reactor contents, for instance, by a circulating pump which feeds reaction mixture taken off at the bottom of the reactor back to the same reaction stage. Provision is made for feeding of reaction mixture from one stage to the next after the desired conversion has been achieved. The feed streams of hydrogen peroxide solution, ethylenic compound, catalyst, and water are fed to the first reactor and reacted mixture is withdrawn from the final reactor of the series. Other ways of carrying out the process can be used.

The catalyst can be added in the form of the preformed acid salt of an acid of a heavy metal of group VI, preferably tungsten or molybdenum. Alternatively, the acid salt can be formed in the reaction mixture by adding an oxide or the acid of the heavy metal in its free state and a base, or by adding the neutral salt of the acid of the heavy metal and a suitable acid which can be the acid of the heavy metal or another strong acid in the necessary controlled proportions. Depending upon the type of ethylenic compound which is epoxidized and the reaction conditions employed, particularly the amount of acid persalt catalyst used, the required pH of between 3.0 and 7 can be maintained in the reaction mixture without need for additional pH control. More usually, however, due to the tendency to form acidic by-products during the reaction, it is desirable to add additional base or suitable buffering agents or the like to insure that the pH of the mixture is maintained within the indicated necessary range, preferably between about 4.5 and about 6, at least until the bulk of the hydrogen peroxide has been reacted, and more preferably throughout the reaction.

It is not always feasible to completely avoid hydration of the epoxide produced but, since the polyols which result from the hydration are also valuable products, this is not a great disadvantage of the process. In many cases it is not necessary to separate the epoxide product from the polyol by-product thus obtained in order to make use of the epoxide value of the product. For instance, the epoxide can be converted to other products by reaction with suitable reactants with or without conversion of the polyol present therewith in the product and such conversion can constitute advantageous recovery of the epoxide value of the product according to the invention. Generally, however, it is advantageous to remove any excess ethylenic compound present before carrying out such recovery of the epoxide value of the product. Such removal of excess ethylenic compound will usually be desirable prior to recovery of the epoxide in a pure or purified form which can be carried out by distillation and/or extraction or other suitable methods.

A feature of the invention according to one of its modifications comprises hydration of the epoxide product to obtain the corresponding polyhydroxy compound. This method of operation gives important advantages over other methods of producing polyhydroxy products from ethylenic compounds and hydrogen peroxide. It is especially useful in the production of triols from ethylenic alcohols. As ordinarily carried out, to produce a triol the reaction of ethylenic alcohols with hydrogen peroxide is subject to side reactions which not only reduce the yield but also, and even more seriously, interfere with the purification of the product. Thus, for example, in the manufacture of glycerine in this way from allyl alcohol the simultaneous formation of small amounts of difficultly removably by-products of a carbonylic character makes it difficult to obtain a product of high purity without extensive refining of the glycerine. In addition, the formation of unsaturated aldehydric impurities, such as acrolein in the case of allyl alcohol, results in troublesome resinification during distillation of the product which interferes with recovery. It has been found that these difficulties can be eliminated or reduced by carrying out the reaction as an initial epoxidation with hydrogen peroxide in the presence of an acid persalt catalyst of the previously mentioned type at a pH between 3 and 7, most preferably from 4.5 to about 5.5, followed by hydration of the epoxide product by reaction with water. This hydration can be carried out in various ways. Continued treatment of the reaction mixture under substantially the same conditions is one method of bringing about hydration of the initially formed epoxy alcohol by water present in the epoxidation mixture, for example. Alternatively the reaction mixture can be heated to a higher temperature after reaction of the hydrogen peroxide is complete, to effect hydration of the epoxide. However, as a rule, we find it more advantageous in reactions with ethylenic alcohols, to remove any excess of such alcohol which may be present in the reaction mixture after completion of the epoxidation stage of the process, before carrying out hydration of the epoxy alcohol since the formation of ethers and other undesirable by-products can be reduced in this way. The hydration time which will be required for complete conversion of the epoxide will depend upon the temperature used and the pH of the mixture as well as the amount of water employed. At temperatures of about 100° to 175° C., for instance, hydration is complete in about 180 to about 5 minutes at a pH of about 5 to 6. A mole ratio of water to epoxide of about 5:1 to about 100:1 is desirable in the reaction mixture for rapid hydration with minimum by-product formation. Hydration is more rapid under more acid conditions, e. g. pH about 1 to 2, but there is a greater tendency to form by-products. The hydration can also be carried out successfully under alkaline conditions. As a rule hydration of the initially formed epoxide is preferably effected at a pH between about 4 and 9, more preferably about 5 to about 7.

The following examples illustrate in more detail some applications of the invention and show some of its advantages.

Example I

The effect of pH on the yield of glycidol from hydrogen peroxide in the continuous epoxidation of allyl alcohol is shown in the following table. The reaction was carried out in three stages operated respectively at 50° C., 60° C. and 70° C. with residence times of 2 hours in the first stage and 1.5 hours in each of the other two stages. The feed, all of which was introduced into the first reaction stage, was aqueous hydrogen peroxide, allyl alcohol in a mole ratio of 1.05 based on the hydrogen peroxide, 35 moles of total water per mole of hydrogen peroxide, and 0.5%, by weight of the total feed, of tungstic acid with varying amounts of an alkaline agent form the sodium acid tungstate catalyst and to control the pH of the mixture.

| pH | | pH Control Additive | | Glycidol Yield |
|---|---|---|---|---|
| Stage 1 | Stage 3 | Agent | Amount, Percent wt. | Mole Pr-cent of H₂O₂ Charged |
| 1.5 | 2.2 | none | 0 | 0 |
| 3.0 | 4.8 | NaOH | 0.079 | 36.5 |
| 4.2 | 5.9 | Na₂HPO₄ | 0.720 | 50.2 |
| 5.4 | 5.6 | NaOH | 0.092 | 52.8 |
| 5.5 | 6.0 | Na₂CO₃ | 0.140 | 59.4 |
| 6.5 | 6.9 | NaOH | 0.120 | 55.3 |
| 7.5 | 7.5 | NaOH | 0.160 | 45 |

Example II

The advantageous influence of high concentration of ethylenic compound in the epoxidation of allyl alcohol is shown by the following tests carried out by reaction in three stages at 50° C., 60° C. and 70° C. and residence times of 2, 1.5 and 1.5 hours, respectively, in the stages, and a water to hydrogen peroxide mole ratio in the feed, all of which was supplied to the first stage, of about 3.4. The tests were made at two different concentrations of sodium acid tungstate obtained by adding 0.5 and 1.5% by weight respectively of tungstic acid and sufficient sodium hydroxide to convert the tungstic acid to the acid salt and to control the pH of the mixture.

| | Allyl Alcohol to Hydrogen Peroxide (mole ratio) | Tungstic Acid (wt. percent) of Feed) | pH | | Glycidol Yield (Mole percent of H₂O₂ Charged) |
|---|---|---|---|---|---|
| | | | Stage 1 | Stage 2 | |
| Test A | 1.05 | 0.5 | 5.4 | 5.6 | 52.8 |
| | 1.50 | 0.5 | 5.6 | 5.9 | 69.7 |
| Test B | 1.05 | 1.5 | 5.5 | 6.2 | 64.7 |
| | 1.50 | 1.5 | 6.0 | 6.8 | 77.0 |

Example III

The effect of varying the concentration of sodium acid tungstate catalyst when epoxidizing allyl alcohol in a three-stage continuous reactor system operated at 50° C., 60° C. and 70° C. in the successive stages, with residence times to give hydrogen peroxide conversions of about 65% in stage 1, 95% in stage 2 and 99% in stage 3 is shown by the following results:

| H₂WO₄ Added [1] (wt. percent of feed) | pH | | Glycidol to Glycerol Ratio in product (mole ratio) | Glycidol Yield | |
|---|---|---|---|---|---|
| | Stage 1 | Stage 3 | | Mole percent on H₂O₂ Charged | Mole percent on AA Reacted |
| 3.0 | 6.4 | 7.4 | 8.7 | 82.0 | 87.9 |
| 1.5 | 6.0 | 6.5 | 9.1 | 76.9 | 81.4 |
| 0.5 | 5.6 | 6.2 | 3.5 | 69.6 | 71.7 |
| 0.1 | 5.2 | 5.9 | 1.5 | 53.6 | 56.4 |
| 0.05 | 4.8 | 3.9 | 0.4 | 26.7 | 27.8 |
| 0.02 | 5.3 | 3.9 | 0.2 | 16.2 | 17.3 |

[1] The tungstic acid was added with sufficient base to form the sodium acid tungstate and control the pH of the mixture as indicated.

Example IV

The importance of keeping the temperature low during the epoxidation to minimize the hydration of glycidol before the allyl alcohol is removed is shown by the higher glycidol yields on either hydrogen peroxide charged or the allyl alcohol consumed. Epoxidation under three-stage continuous operation of a feed containing 1.0 mole hydrogen peroxide, 1.5 moles allyl alcohol and 33.5 moles water and 0.5% w. sodium acid tungstate (based on the total feed) with successive stage pH levels of 5.5, 5.6 and 6.1 gave a glycidol yield based on hydrogen peroxide charged of 69.5 mole percent when the successive stages were operated at 50°, 60° and 70° C., and 81.4 mole percent when these temperatures were 45°, 45° and 45° C. in the successive stages. The corresponding glycidol yields based on the allyl alcohol consumed were 71.7 mole percent at the higher temperature level and 84.3 mole percent at the lower temperature level.

Example V

Batch epoxidation of allyl alcohol was carried out using an allyl alcohol to hydrogen peroxide mole ratio of 1.5, a mole ratio of water to hydrogen peroxide of 33.5, 0.5% by weight of tungstic acid, plus sufficient sodium hydroxide to form sodium acid tungstate and maintain the pH at 4.2 to 4.5. With a residence time of 2.4 hours the hydrogen peroxide conversion was 99.1% and the product had a glycidol to glycerol mole ratio of 13.3. The yield of glycidol based on hydrogen peroxide applied was 86.9%.

Example VI

Epoxidizing methallyl alcohol under the conditions of Example V while maintaining the pH at about 5.0 gives a high yield of 2-methyl-glycidol.

The similar reaction of 1,4-butene-2-diol with hydrogen peroxide at a pH of 5.0 to 5.5 gives 2,3-epoxybutane-1,4-diol in excellent yield.

Example VII

Similar good yields of glycidol are obtained by substituting sodium acid phosphotungstate for the sodium acid tungstate catalyst in the method of Example V. When sodium acid molybdate is used as the catalyst in the same way the production of glycidol is somewhat lower.

Example VIII

The advantage of pH control throughout the successive stages of epoxidation is evidenced by the higher glycidol to glycerol ratio and the higher overall yield of hydrated glycidol to glycerol after stripping off the unreacted allyl alcohol. Epoxidation of a feed containing 1.0 mole hydrogen peroxide, 1.5 moles allyl alcohol, 33.5 moles water and 0.02% tungstic acid (based on the total feed) using three-stage continuous epoxidation at 50° C. and 30 hours residence per stage, gave a glycidol to glycerol mole ratio in the product of 0.24 when the pH in the three stages were 5.2, 3.8 and 3.9 and a mole ratio of 0.46 when the pH was controlled at 5.3, 5.3 and 5.9. After removal of the unreacted allyl alcohol and hydration at 145° C. and 100 p. s. i. g. the final yields of glycerol based on the allyl alcohol consumed were 84 mole percent for the lower pH case and 87 mole percent for the higher pH case.

Example IX

Hydration of the product containing 0.055 equivalent of glycerol and 0.103 equivalent of glycidol per 100 grams made by batch reaction of allyl alcohol with hydrogen peroxide using about 0.5% sodium acid tungstate as catalyst at a pH of 5.5 was carried out by refluxing at 100° C. At 3½ to 4 hours' reaction time a yield of 93.2% additional glycerol based on the glycidol originally present was obtained. Using 0.1 equivalent of added $H_2SO_4$, $NaHCO_3$ or $Na_2CO_3$ per equivalent of glycidol reduced the hydration times to 1 to 1½ hours, 2 hours, and 3 to 3½ hours, respectively, the hydration yields being 87.2%, 90.1% and 79.7%, respectively.

Example X

Reaction of allyl alcohol with hydrogen peroxide in the presence of sodium acid tungstate catalyst to produce glycerol directly without intermediate separation of the excess allyl alcohol used was carried out in a three-necked flask having a stirrer, reflux condenser, thermometer, and dropping funnel. The flask was charged with 116 grams (2.0 moles) of allyl alcohol, sufficient water to make the final mole ratio of water to allyl alcohol 39:1 and 4.64 grams of sodium acid tungstate ($NaHWO_4$) formed by adding 2.8 grams of sodium tungstate dihydrate and 2.12 grams of tungstic acid. The mixture was warmed to 50° C. with stirring and 100 grams (1 mole) of 34% hydrogen perxodie was added over a period of 2½ hours while the temperature was kept at 50°–55° C. by cooling with a stream of air. After 17½ hours' additional reaction at room temperature the conversion of hydrogen peroxide to glycerol was found to be 57% of the theoretical.

Example XI

Glycerol was produced by reacting allyl alcohol with hydrogen peroxide in a three-stage continuous reactor using sodium acid tungstate as the catalyst with additional sodium hydroxide to maintain the pH 5.1 to 5.5 and heating the resulting mixture under reflux at 100° C. for 4.8 hours after adjusting the pH to 7.0 by addition of 0.1 normal sodium hydroxide. Using temperatures of 50°, 60° and 70° C. and residence times of 2, 1.5 and 1.5 hours in the successive initial stages with a feed of 1.05 moles of allyl alcohol and 35 moles of water per mole of hydrogen peroxide and about 0.5% catalyst to the first reaction stage, the glycerol yield was 81.8% of the theoretical based on the hydrogen peroxide charged at an allyl alcohol conversion of 91.6%. This yield is about 6.5 percentage units higher than is obtained under the same conditions using tungstic acid as the catalyst at a pH of 1.5.

Example XII

The use of calcium acid tungstate as catalyst is illustrated by the following test. This catalyst has the advantage that it can be recovered after the reaction by precipitation as calcium tungstate which can, by addition of acid, for example tungstic acid, be converted to a soluble calcium acid tungstate containing catalyst which has been found effective on recycling to the reaction.

The test was carried out in a three-stage continuous reactor using as feed to the first reaction stage 1.96 moles of allyl alcohol and 31.5 moles of water per mole of hydrogen peroxide. The temperatures and residence times in the three stages were 50°, 60° and 70° C. and 1.0, 0.5 and 0.5 hours, respectively. The catalyst fed was a mixture of 26 mole percent calcium acid tungstate with calcium tungstate in a total amount of 0.547% by weight of the feed mixture and gave a pH of 5.3 in the first and final stages.

The conversions of hydrogen peroxide and allyl alcohol were 99.6% and 47.4%. The product had a glycidol to glycerol mole ratio of 6.7 and the yield of glycidol was 75.2 mole percent on peroxide applied.

Substantially complete precipitation of the catalyst is obtained by neutralizing the reaction mixture with lime provided the pH is kept below about 8. The precipitated calcium tungstate is readily recovered by filtration and can be recycled with added tungstic acid in the amount required to give a pH of 4.5 to 6.5 to serve as catalyst in the process.

The mixture of glycidol and glycerol obtained was hydrated by batch refluxing at about 100° C. for 6 hours and a yield of glycerol of 82.8% based on allyl alcohol consumed and 77.2% based on the hydrogen peroxide applied was obtained.

When using magnesium acid tungstate as the catalyst under similar reaction conditions good yields of glycidol are also obtained.

It will be understood that the foregoing examples are merely illlustrative and that the present invention broadly comprises contacting an ethylenically unsaturated compound with hydrogen peroxide or a compound which forms such peroxide under the reaction conditions in an acidic aqueous medium at a pH of at least 3 in the presence of an acid salt of a peracid of a heavy metal whereby an epoxide is formed. In addition to the specific ethylenically unsaturated compounds mentioned in these examples, other aliphtic, cycloaliphatic and aralkyl ethylenically unsaturated compounds can be used in the process of this invention. Specific examples of compounds which can be thus epoxidized successfully include the following non-conjugated ethylenic compounds containing not more than two ethylenic groups and having at least one carbon atom between any two such ethylenic groups: the olefinic hydrocarbons such as 2-butene, isobutylene, the amylenes, 2-octene, 3-decene, dodecenes from propylene polymerization, cyclopentene, cyclohexene, 4-methyl, cyclohexene, and the like; ethylenic ethers of the foregoing ethylenic alcohols which may be the simple ethers or mixed ethers with either saturated or unsaturated alcohols, as well as vinyl ethers, for example, methyl vinyl ether, allyl vinyl ether, isopropyl isopropenyl ether, isocrotyl butyl ether, methyl cyclohexenyl ether, ethyl oleyl ether, methallyl cinnamyl ether, etc. Ethylenic esters which can be esters of ethylenic acids with saturated or unsaturated alcohols or esters of the previously mentioned ethylenic alcohols with carboxylic acids constitute another class of ethylenic starting compounds with which the present process is especially useful. Examples of suitable esters are, for instance, ethyl methacrylate, propyl crotonate, allyl crotonate, allyl acetate, oleyl acetate, cyclohexyl acrylate, diethyl maleate, oleyl cinnamate, ethyl linoleate, unsaturated fatty acid glycerides, and the like. Other ethylenic carbonyl compounds can also be epoxidized in accordance with the invention, for example, methyl vinyl ketone, methyl allyl ketone, ethyl isopropenyl ketone, mesityl oxide, phorone, isophorone, methyl cyclohexenyl ketone, vinyl phenyl ketone, crotonaldehyde, citronellol, the cyclocitrals, ionone, cinnamyl aldehyde, etc. Ethylenic halides such as crotyl chloride, methallyl chloride and the like are another type of ethylenic compound which can be successfully epoxidized by the new method. The preferred ethylenically unsaturated starting compounds are the neutral compounds having three to about eighteen carbon atoms per molecule.

The invention will thus be seen to be capable of wide variation not only with respect to the ethylenic compounds which can be successfully reacted and the acid persalt catalysts which are effective in promoting the reaction, but also in regard to the method of carrying out the new process in its various modifications. The invention is therefore not limited to the examples which have been given nor by any theory proposed in explanation of the improved results which are obtained.

We claim as our invention:

1. A process for producing an epoxide which comprises reacting a non-conjugated ethylenic compound containing not more than two ethylenic groups and having at least one carbon atom between any two such ethylenic groups with hydrogen peroxide in the presence of an acid salt of an unstable peracid-forming acid of a heavy metal of the group consisting of tungsten and molybdenum at a pH between 3.0 and 7.0.

2. A process for producing an epoxide which comprises intimately contacting a non-conjugated ethylenic compound containing not more than two ethylenic groups and having at least one carbon atom between any two such ethylenic groups, hydrogen peroxide and an acid salt of an acid of a metal of the group consisting of tungsten and molybdenum in an acidic aqueous medium at a pH of at least 3.0.

3. A process for producing an epoxide which comprises intimately contacting a non-conjugated ethylenic compound containing not more than two ethylenic groups and having at least one carbon atom between any two such ethylenic groups with an aqueous solution of hydrogen peroxide and a water-soluble acid salt of an acid of a metal of the group consisting of tungsten and molybdenum while maintaining the pH of the mixture between 3.0 and 7.0.

4. A process for producing an epoxy alcohol which comprises contacting a mono-ethylenic alcohol with hydrogen peroxide in the presence of a water-soluble acid salt of an acid of a metal of the group consisting of tungsten and molybdenum while maintaining the pH of the mixture between 3.0 and 7.0.

5. A process for producing glycidol which comprises contacting allyl alcohol in an aqueous medium with hydrogen peroxide and a water-soluble acid salt of an acid of a metal of the group consisting of tungsten and molybdenum while maintaining the pH of the mixture between 3.0 and 7.0.

6. A process for producing an epoxy alcohol which comprises contacting a mono-ethylenic alcohol with hydrogen peroxide in the presence of a water-soluble acid salt of a tungstic acid at a pH between 3.0 and 7.0.

7. A process for producing glycidol which comprises contacting allyl alcohol in an aqueous medium with hydrogen peroxide and an alkali metal acid tungstate at a pH between 3.0 and 7.0.

8. A process in accordance with claim 7 wherein the mole ratio of allyl alcohol to hydrogen peroxide is 1:1 to 5:1, the mole ratio of water to hydrogen peroxide is 7:1 to 70:1, and the concentration of catalyst in the reaction mixture is 0.01% to about 2% by weight.

9. A process in accordance with claim 7 wherein the acid tungstate is produced in the reaction by adding sodium hydroxide and tungstic acid to the aqueous reaction mixture in proportions which give a pH between about 4.5 and 6.0.

10. A process for producing an epoxide which comprises intimately contacting an ethylenic compound containing not more than two ethylenic groups and having at least one carbon atom between any two such ethylenic groups, hydrogen peroxide and an acid salt of a molybdic acid in an aqueous medium at a pH between 3.0 and 7.0.

11. A process for producing an epoxide which comprises intimately contacting an ethylenic compound containing not more than two ethylenic groups and having at least one carbon atom between any two such ethylenic groups, hydrogen peroxide and an acid salt of a heteropolytungstic acid in an aqueous medium at a pH between 3.0 and 7.0.

12. A process for producing an epoxy alcohol which comprises contacting a mono-ethylenic alcohol with hydrogen peroxide in the presence of an alkali metal acid phosphotungstate at a pH between 3.0 and 7.0.

13. A process for producing glycidol which comprises contacting allyl alcohol in an aqueous medium with hydrogen peroxide and an alkali metal acid phosphotungstate at a pH between 3.0 and 7.0.

14. A process in accordance with claim 2 wherein the ethylenic compound is a beta,gamma-ethylenic alcohol.

15. A process in accordance with claim 14 wherein the ethylenic compound is allyl alcohol.

16. A process in accordance with claim 14 wherein the ethylenic compound is 1,4-butene-2-diol.

References Cited in the file of this patent

UNITED STATES PATENTS

| Number | Name | Date |
|---|---|---|
| 2,312,535 | Feiser | Mar. 2, 1943 |
| 2,373,942 | Bergsteinsson | Apr. 17, 1945 |
| 2,414,385 | Milas | Jan. 14, 1947 |
| 2,500,599 | Bergsteinsson | Mar. 14, 1950 |
| 2,543,419 | Neiderhauser | Feb. 27, 1951 |
| 2,555,927 | Himel | June 5, 1951 |
| 2,613,223 | Young | Oct. 7, 1952 |

OTHER REFERENCES

Mugdan: J. Chem. Soc., 1949, 2988–3000.